US009268106B2

(12) United States Patent
Lee et al.

(10) Patent No.: US 9,268,106 B2
(45) Date of Patent: Feb. 23, 2016

(54) OPTICAL FIBER SECURING DEVICE

(71) Applicant: FINISAR CORPORATION, Sunnyvale, CA (US)

(72) Inventors: David Lee, San Jose, CA (US); Daniel Kossowski, Santa Clara, CA (US); Frank Flens, Campbell, CA (US); William H. Wang, Pleasanton, CA (US); Michael Joseph McReynolds, Jr., San Mateo, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 139 days.

(21) Appl. No.: 14/095,662

(22) Filed: Dec. 3, 2013

(65) Prior Publication Data

US 2014/0185995 A1    Jul. 3, 2014

Related U.S. Application Data

(60) Provisional application No. 61/732,861, filed on Dec. 3, 2012, provisional application No. 61/732,886, filed on Dec. 3, 2012.

(51) Int. Cl.
*G02B 6/36* (2006.01)
*G02B 6/42* (2006.01)

(52) U.S. Cl.
CPC .............. *G02B 6/4239* (2013.01); *G02B 6/425* (2013.01); *G02B 6/4214* (2013.01); *G02B 6/4221* (2013.01); *G02B 6/4233* (2013.01)

(58) Field of Classification Search
USPC .......................................................... 385/93
See application file for complete search history.

(56) References Cited

U.S. PATENT DOCUMENTS

| 2003/0016918 | A1* | 1/2003 | Grabbe ........................... 385/78 |
| 2003/0021548 | A1* | 1/2003 | Luther et al. ..................... 385/86 |
| 2005/0018974 | A1* | 1/2005 | Rolston et al. .................. 385/83 |
| 2009/0010603 | A1* | 1/2009 | Sugioka et al. ............... 385/123 |
| 2012/0027346 | A1* | 2/2012 | Castagna et al. ................ 385/33 |
| 2014/0099058 | A1* | 4/2014 | Charbonneau-Lefort et al. ................ 385/33 |
| 2014/0105543 | A1* | 4/2014 | de Jong .......................... 385/77 |
| 2014/0270651 | A1* | 9/2014 | Kadar-Kallen et al. ......... 385/79 |
| 2014/0321814 | A1* | 10/2014 | Chen et al. ..................... 385/79 |
| 2014/0355934 | A1* | 12/2014 | Shao et al. ..................... 385/33 |
| 2015/0074967 | A1* | 3/2015 | Li et al. ........................ 29/401.1 |

* cited by examiner

*Primary Examiner* — Sung Pak
(74) *Attorney, Agent, or Firm* — Maschoff Brennan

(57) ABSTRACT

An optical fiber securing device may include a passage, an epoxy well, an epoxy path, an optical fiber seat, and a protrusion. The passage may have an entrance and an exit, the passage configured to receive therein an optical fiber inserted through the entrance. The epoxy well may be configured to receive therein epoxy. The epoxy path may provide a pathway for epoxy between the epoxy well and the passage. The optical fiber seat may be configured to receive at least a portion of the optical fiber, the optical fiber seat configured to position an end of the optical fiber in optical alignment with a lens. The protrusion may define an upper boundary of the passage at the exit of the passage, the protrusion configured to restrain epoxy received within the passage such that the epoxy does not become interposed between the end of the optical fiber and the lens.

19 Claims, 8 Drawing Sheets

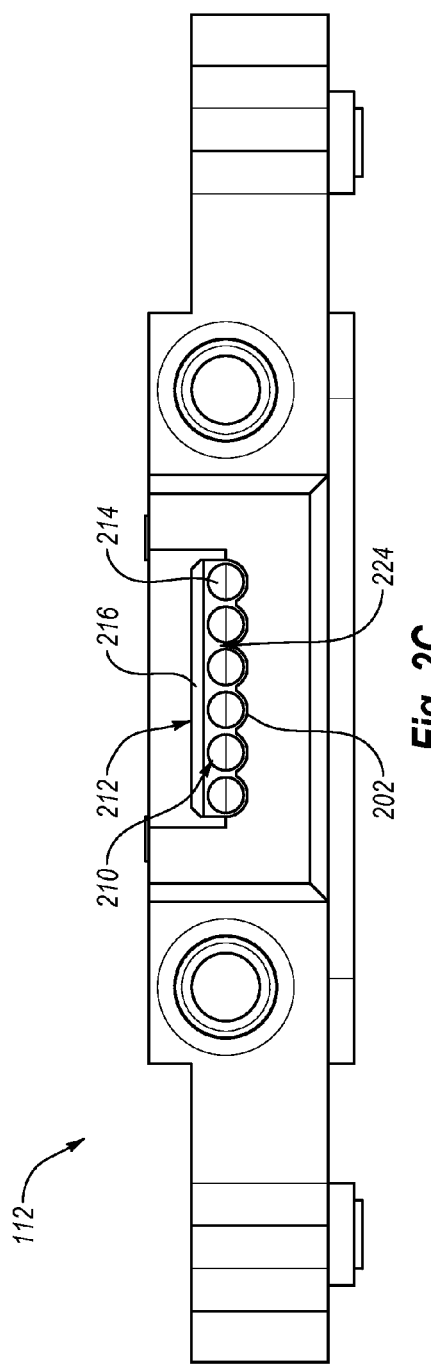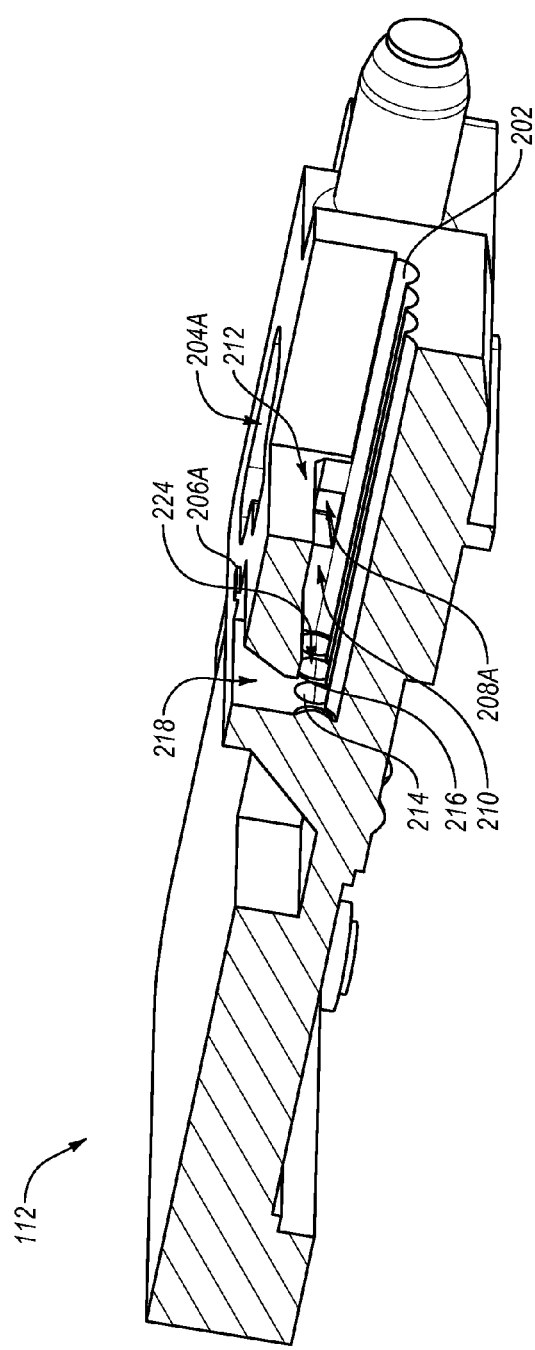

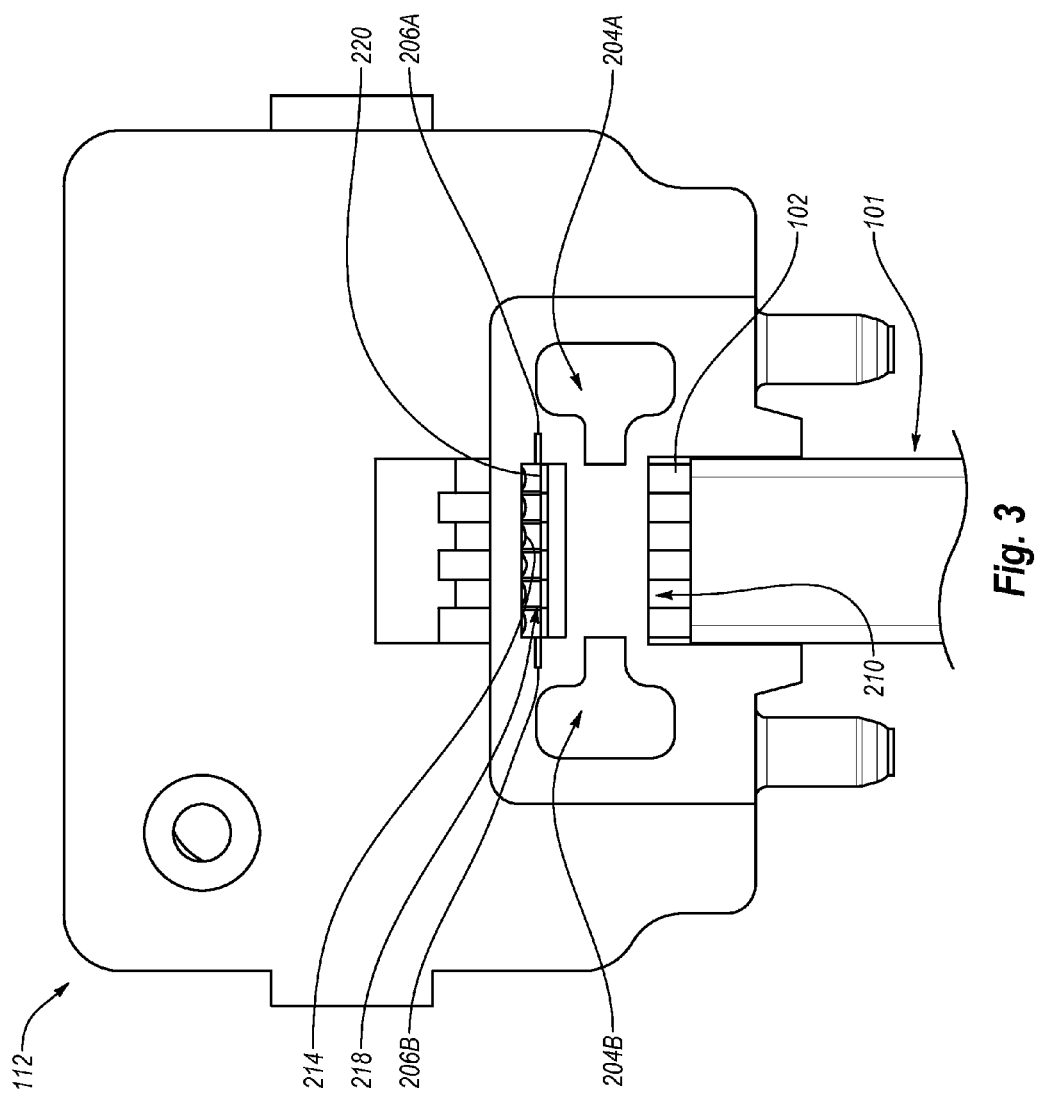

OPTICAL FIBER SECURING DEVICE

CROSS-REFERENCE TO RELATED APPLICATIONS

This patent application claims the benefit of and priority to U.S. Provisional Application No. 61/732,861, filed Dec. 3, 2012, and to U.S. Provisional Application No. 61/732,886, filed Dec. 3, 2012. Both of the foregoing provisional applications are incorporated herein by reference.

FIELD

The embodiments discussed herein relate to systems and methods for securing an optical fiber. In particular, embodiments may relate to securing an optical fiber relative to a lens.

BACKGROUND

Manufacturing a mass-produced optical connector may involve quickly and permanently securing one or more optical fibers in a precise position relative to one or more lenses. Positioning the optical fibers relative to the lenses and simply applying epoxy may run the risk of applying epoxy on the ends of the optical fibers or on the lenses, which may produce a defective connector.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Embodiments relate to systems and methods for securing an optical fiber. In particular, embodiments may relate to securing an optical fiber relative to a lens.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, an optical fiber securing device may include a passage, an epoxy well, an epoxy path, an optical fiber seat, and a protrusion. The passage may have an entrance and an exit, the passage configured to receive therein an optical fiber inserted through the entrance. The epoxy well may be configured to receive therein an epoxy. The epoxy path may provide a pathway for epoxy between the epoxy well and the passage. The optical fiber seat may be configured to receive at least a portion of the optical fiber, the optical fiber seat configured to position an end of the optical fiber in optical alignment with a lens. The protrusion may define an upper boundary of the passage at the exit of the passage, the protrusion configured to restrain epoxy received within the passage such that the epoxy does not become interposed between the end of the optical fiber and the lens.

In another example embodiment, an active cable device may include an optical cable and an optoelectronic plug. The optical cable may have opposing first and second ends and may include an optical fiber extending from the first end to the second end. The optoelectronic plug may be coupled to the first end of the optical cable, the optoelectronic plug including a lens block. The lens block may include a lens, a passage, an optical fiber seat, an epoxy well, and an epoxy path. The passage may be configured to receive therein a portion of the optical fiber. The optical fiber seat may define a lower boundary of the passage and may be configured to optically align an end of the optical fiber with the lens. The epoxy well may be configured to receive therein epoxy. The epoxy path may provide a pathway for epoxy to travel from the epoxy well to the passage.

In another example embodiment, a method of assembling an active cable device is described. The active cable device may include an optical cable with an optical fiber and an optoelectronic plug coupled to one end of the optical cable. The method may include inserting the optical fiber of the optical cable into a passage of a lens block of the optoelectronic plug such that a portion of the optical fiber is positioned within the passage and an end of the optical fiber is positioned outside the passage. The method may also include optically aligning the end of the optical fiber with a lens of the lens block. The method may also include adding epoxy to an epoxy well of the lens block, where an epoxy path of the lens block provides a pathway for epoxy to travel from the epoxy well to the passage. The method may also include securing the optical fiber to the lens block using the epoxy.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

Embodiments will be described and explained with additional specificity and detail through the use of the accompanying drawings in which:

FIG. 2C is a rear view of the lens block of FIG. 2A;

FIG. 2D is a cutaway rear perspective view of the lens block of FIG. 2A;

FIG. 3 is top view of the lens block of FIG. 2A with an optical cable positioned in a passage of the lens block.

DESCRIPTION OF EMBODIMENTS

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1A:
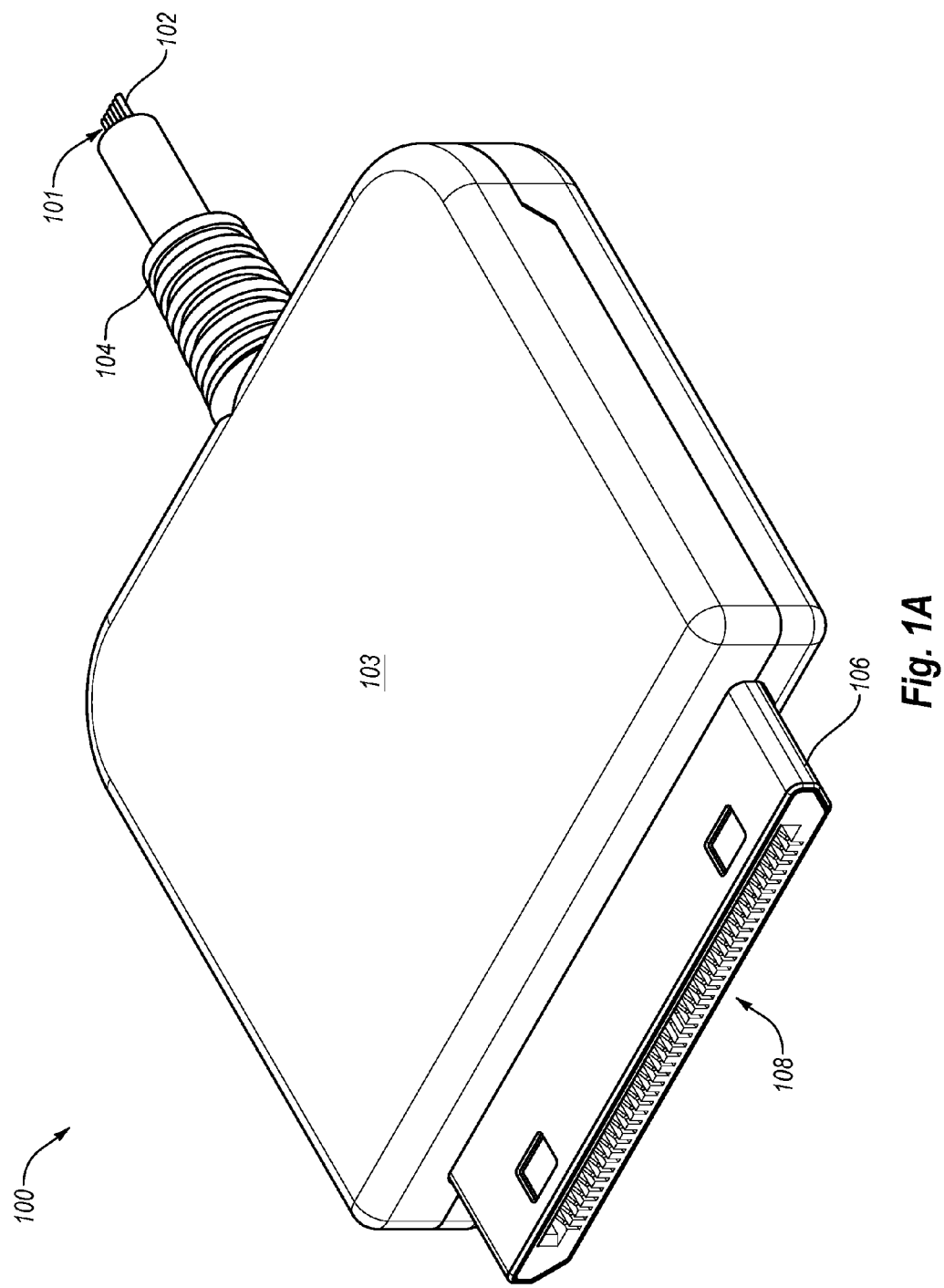
FIG. 1A is a perspective view of an example optoelectronic plug.

FIG. 1A is a perspective view of an example optoelectronic plug 100, arranged in accordance with at least one embodiment described herein. The optoelectronic plug 100 includes an optical cable 101, which may include multiple optical fibers 102. Alternately, the optical cable 101 may include a single optical fiber 102.

The optoelectronic plug 100 includes a plug housing 103. The optical cable 101 is partially located within the plug housing 103. Optionally, the optoelectronic plug 100 may include a resilient sleeve 104 to protect the optical cable 101 from bending to a smaller bend radius than a minimum bend radius of the optical cable 101 and/or of the optical fibers 102. Preventing the optical cable 101 from bending to a smaller bend radius than the minimum bend radius may prevent damage to the optical fibers 102.

The optoelectronic plug 100 further includes a connector housing 106. Multiple pins 108 may be at least partially enclosed within the connector housing 106. The connector housing 106 and the pins 108 may be inserted into a device (not shown) that may be in electrical communication with the optoelectronic plug 100 via the pins 108.

In general, the optoelectronic plug 100 may be employed in the communication of optical signals and the conversion of optical signals to and from electrical signals. A connected host device may be employed in the communication, generation, and/or use of corresponding electrical signals.

A similar optoelectronic plug (not shown) may be connected to a second end of the optical cable 101 and plugged into another host device (not shown). Electrical signals produced at one of the host devices that is connected to the optoelectronic plug 100 of FIG. 1A may be converted to optical signals by the optoelectronic plug 100. The converted optical signals may then be sent through the optical cable 101 to the other optoelectronic plug, which may convert the optical signals back to electrical signals and may communicate those electrical signals to the other connected host device. In some embodiments, the corresponding electrical signals may be used to drive a display device to display images and/or may drive an audio device to produce sound. For example, the optoelectronic plug 100 may be used to communicate video and/or audio signals to a television; the video and/or audio signals may originate from another device that generates the video and/or audio signals. A device that includes an optical cable, such as the optical cable 101, with an optoelectronic plug, such as the optoelectronic plug 100, on each end as described and that communicates over the length of the optical cable using optical signals while communicating with corresponding host devices to which the optoelectronic plugs are coupled using electrical signals may be referred to as an active cable device.

Figure 1B:
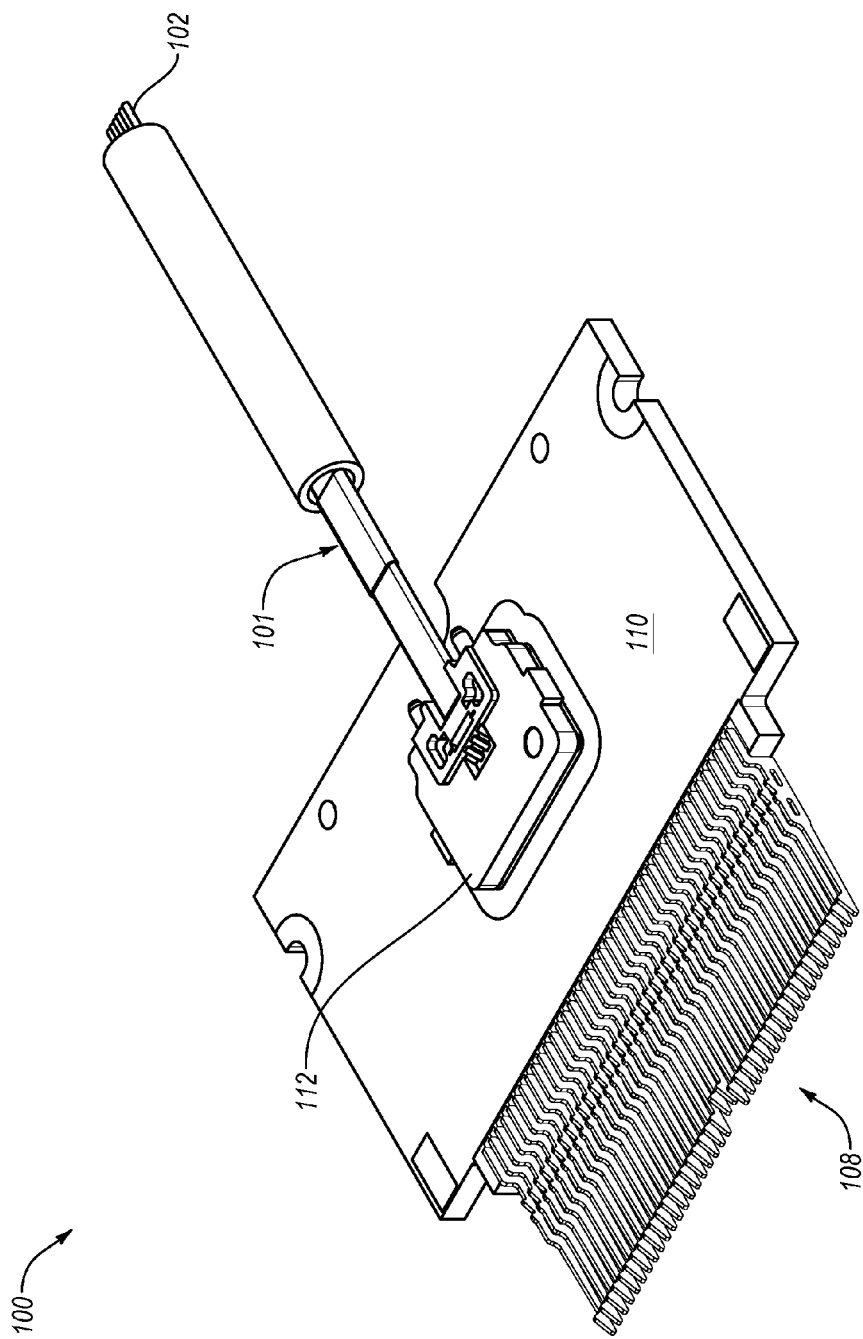
FIG. 1B is a perspective view of a portion of the optoelectronic plug of FIG. 1A.

FIG. 1B is a perspective view of a portion of the optoelectronic plug 100, arranged in accordance with at least one embodiment described herein. In particular, FIG. 1B is a perspective view of the optoelectronic plug 100 with the housing components 103, 104, and 106 removed. The pins 108 are connected to and are in electrical communication with a printed circuit board (PCB) 110. A lens block 112 is mounted on the PCB 110. The lens block 112 is an example of an optical fiber securing device.

In operation, an incoming optical data signal travels from one of the optical fibers 102 of the optical cable 101, through the lens block 112, and is received by a receiver (not shown) of the optoelectronic plug 100. In some embodiments, the receiver is located on the PCB 110. The receiver then converts the incoming optical data signal into an incoming electrical data signal. The incoming electrical data signal is then passed or communicated through at least one of the pins 108 to a corresponding host device (not shown).

Similarly, an outgoing electrical data signal is passed or communicated through at least one of the pins 108 by the host device. The outgoing electrical signal is passed along or communicated to a transmitter (not shown) of the optoelectronic plug 100. In some embodiments, the transmitter is located on the PCB 110. The transmitter converts the outgoing electrical data signal to an outgoing optical data signal. The outgoing optical data signal is emitted by the transmitter through the lens block 112 and into one of the optical fibers 102 of the optical cable 101. Although the optoelectronic plug 100 has been described as including one receiver and one transmitter, more generally, the optoelectronic plug 100 may include one or more receivers and/or one or more transmitters.

FIGS. 2A-2E include a front perspective view, a rear perspective view, a rear view, a cutaway rear perspective view, and a top view, respectively, of the lens block 112 that may be included in the optoelectronic plug 100 of FIG. 1A, arranged in accordance with at least one embodiment described herein. FIG. 3 is a top view of the lens block 112 with the optical cable 101 positioned in a passage 210 of the lens block 112, arranged in accordance with at least one embodiment described herein.

With reference to FIGS. 2A-2E and FIG. 3, the lens block 112 includes one or more optical fiber seats 202. The optical fiber seats 202 are generally configured to receive at least a portion of the optical fibers 102. In particular, each of the optical fiber seats 202 may be configured to receive at least a portion of a corresponding one of the optical fibers 102. The optical fiber seats 202 may be shaped to position the optical fibers 102 such that optical fiber ends 220 (FIG. 3 only) of the optical fibers 102 may be in optical alignment with the respective lenses 214 of the lens block 112.

The optical fiber seats 202 may be located at least partially within the passage 210. In some embodiments, the optical fiber seats 202 may run from an edge of the lens block 112, through the passage 210, to the lenses 214. Alternately or additionally, the optical fiber seats 202 may start away from the edge of the lens block 112, and/or may end at another position, such as a desired or target position of the optical fiber ends 220.

The optical fiber seats 202 may include curved receiving surfaces. The curved receiving surfaces may have a U-shaped, arc-shaped, semicircle-shaped, or other suitably shaped cross-sectional shape. As best seen in FIG. 2C, for example, the optical fiber seats 202 each have a semicircle-shaped cross-sectional shape. Alternately or additionally, the optical fiber seats 202 may have a V-shaped cross-sectional shape, and/or the cross-sectional shape of each optical fiber seat 202 may include a combination of flat, respectively angled surfaces.

The passage 210 includes an entrance 212 or opening configured to receive the optical fibers 102 into the passage 210. In some embodiments, a surface of the lens block 112 bounding the passage 210 may be ramped to a protrusion 216 (FIGS. 2C and 2D only) to assist with positioning the optical fibers 102 within the optical fiber seats 202 within the passage 210. For instance, the protrusion 216 may confine the optical fibers 102 and limit vertical movement thereof with respect to the lens block 112.

The protrusion 216, sidewalls of the passage 210, and the optical fiber seats 202 may collectively define an exit 224 or opening of the passage 210. The exit 224 may generally allow the optical fiber ends 220 to be located outside of the passage 210. In some embodiments, the exit 224 may be smaller than the entrance 212. For example, the entrance 212 may be relatively larger to facilitate insertion of the optical fibers 102 into the passage 210, and in contrast, the exit 224 may be relatively smaller with a tighter fit for the optical fibers 102 to facilitate proper positioning of the optical fibers 102 with respect to the lens block 112. Alternately, in some embodiments, the exit 224 may be the same size as, or larger than, the entrance 212.

The lens block 112 includes epoxy wells 204A and 204B formed in a body of the lens block 112. For instance, the epoxy wells 204A and 204B may be implemented as recesses formed in the body of the lens block 112. Although shown as having two epoxy wells 204A and 204B, the lens block 112 may include a different number of epoxy wells. For example, the lens block 112 may include a single epoxy well, or three or more epoxy wells. The epoxy wells 204A and 204B may generally be configured to accept an epoxy. A volume of the epoxy wells 204A and 204B may be such that filling the epoxy wells 204A and 204B with an epoxy ensures sufficient epoxy will ultimately enter the passage 210 to suitably bond the optical fibers 102 to the lens block 112.

The lens block 112 may include holes or epoxy paths 208A and 208B (208A is in FIGS. 2A, 2B, and 2D, 208B is in FIGS. 2A and 2B) between the epoxy wells 204A and 204B and the passage 210. The holes 208A and 208B may provide a path between the epoxy wells 204A and 204B and the passage 210 such that epoxy in the epoxy wells 204A and 204B can move from the epoxy wells 204A and 204B to the passage 210. For instance, epoxy added to the epoxy well 204A may flow through the hole 208A into the passage 210, while epoxy added to the epoxy well 204B may similarly flow through the hole 208B into the passage 210. Because the epoxy wells 204A and 204B are positioned on opposite sides of the passage 210, the holes 208A and 208B allow epoxy to be added from both sides of the passage 210.

In some embodiments, a liquid epoxy (not shown) may be added to or otherwise placed in the epoxy wells 204A and 204B. Alternately or additionally, solid, powder, and/or semi-solid epoxy may be added to or otherwise placed in the epoxy wells 204A and 204B. In some embodiments, the epoxy may be heated or otherwise processed such that the epoxy melts into a liquid state and/or is sufficiently viscous to flow through the holes 208A and 208B into the passage 210.

The epoxy may be added to or otherwise placed in the epoxy wells 204A and 204B and/or may be changed to a liquid state or brought to a desired viscosity after the optical fibers 102 have been positioned at a target position or desired position in the passage 210 within the lens block 112.

The epoxy may be encouraged to move from the epoxy wells 204A and 204B to the passage 210 through the holes 208A and 208B by way of capillary action. For example, the dimensions of the space between the optical fibers 102 and the surrounding passage 210 may promote the epoxy to flow through the space at least in part by way of capillary action. The epoxy may be made to flow around the optical fibers 102 and throughout the passage 210 such that the optical fibers 102 are satisfactorily secured within the lens block 112 when the epoxy cures.

In some embodiments, the protrusion 216 may prevent the epoxy from flowing beyond the exit 224 of the passage 210 and to thereby prevent the epoxy from becoming interposed between the optical fiber ends 220 and the lenses 214. For instance, an opening around the optical fibers 102 that is at least partially defined by the protrusion 216 may be sized to generate surface tension on the epoxy that keeps the epoxy from substantially flowing past the protrusion 216. In some embodiments, for example, the epoxy may form a meniscus that extends beyond the exit 224 without allowing the epoxy to flow between the optical fiber ends 220 and the lenses 214. Preventing or substantially preventing the epoxy from becoming interposed between the optical fiber ends 220 and the lenses 214 may substantially reduce the likelihood of manufacturing a defective optoelectronic plug 100.

Figure 2A:
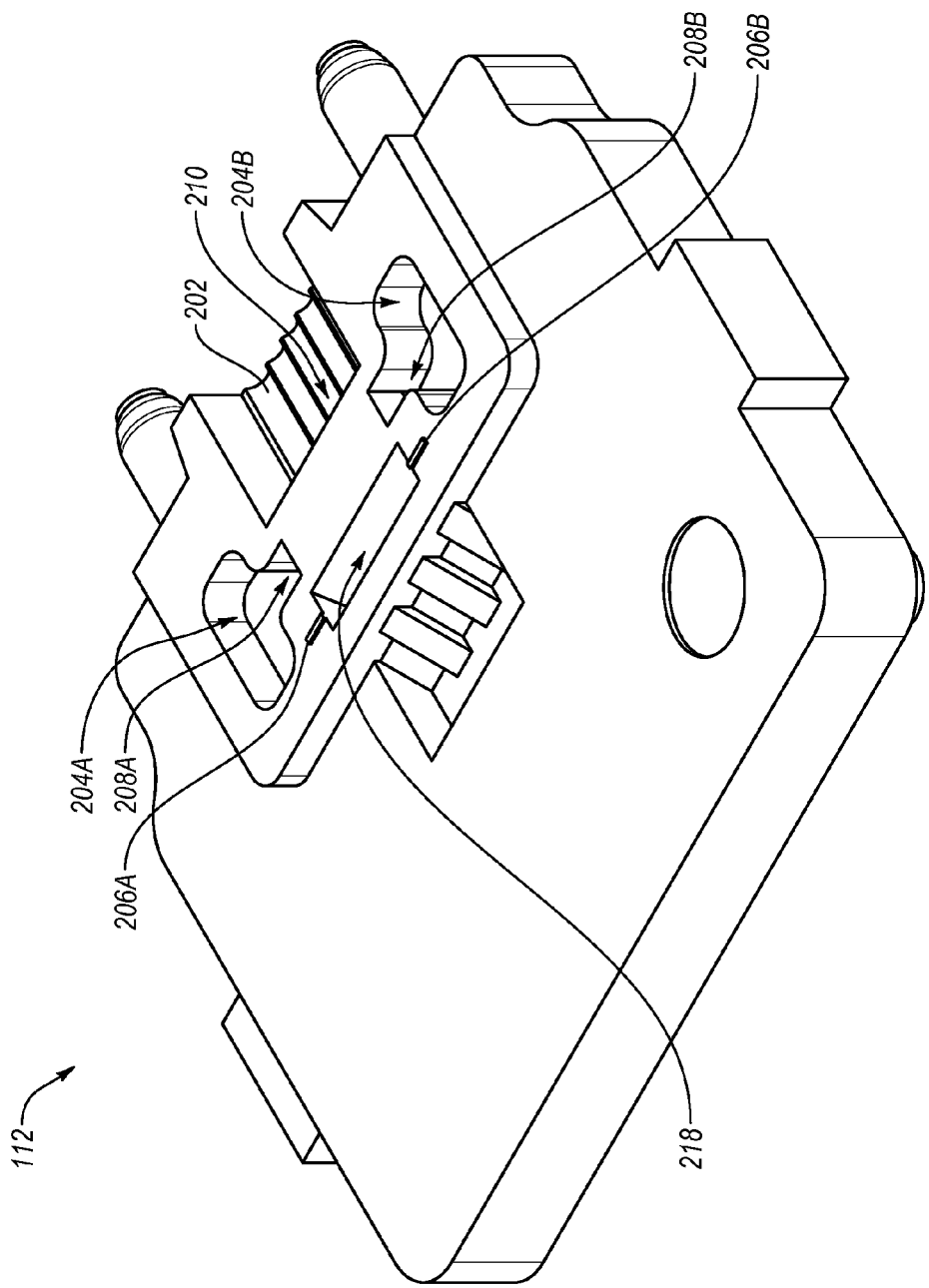
FIG. 2A is a front perspective view of a lens block that may be included in the optoelectronic plug of FIG. 1A.
Figure 2B:
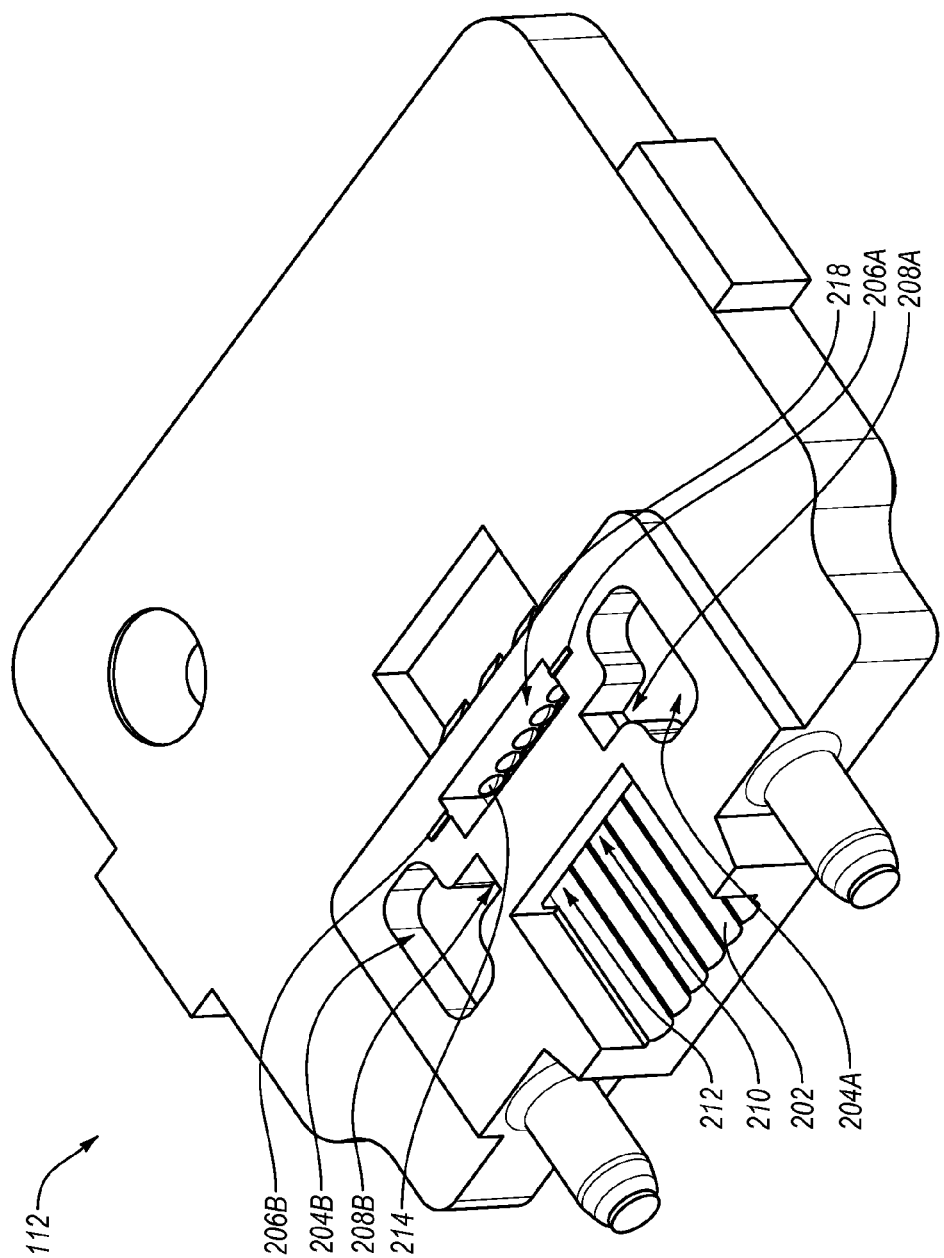
FIG. 2B is a rear perspective view of the lens block of FIG. 2A.
Figure 2E:
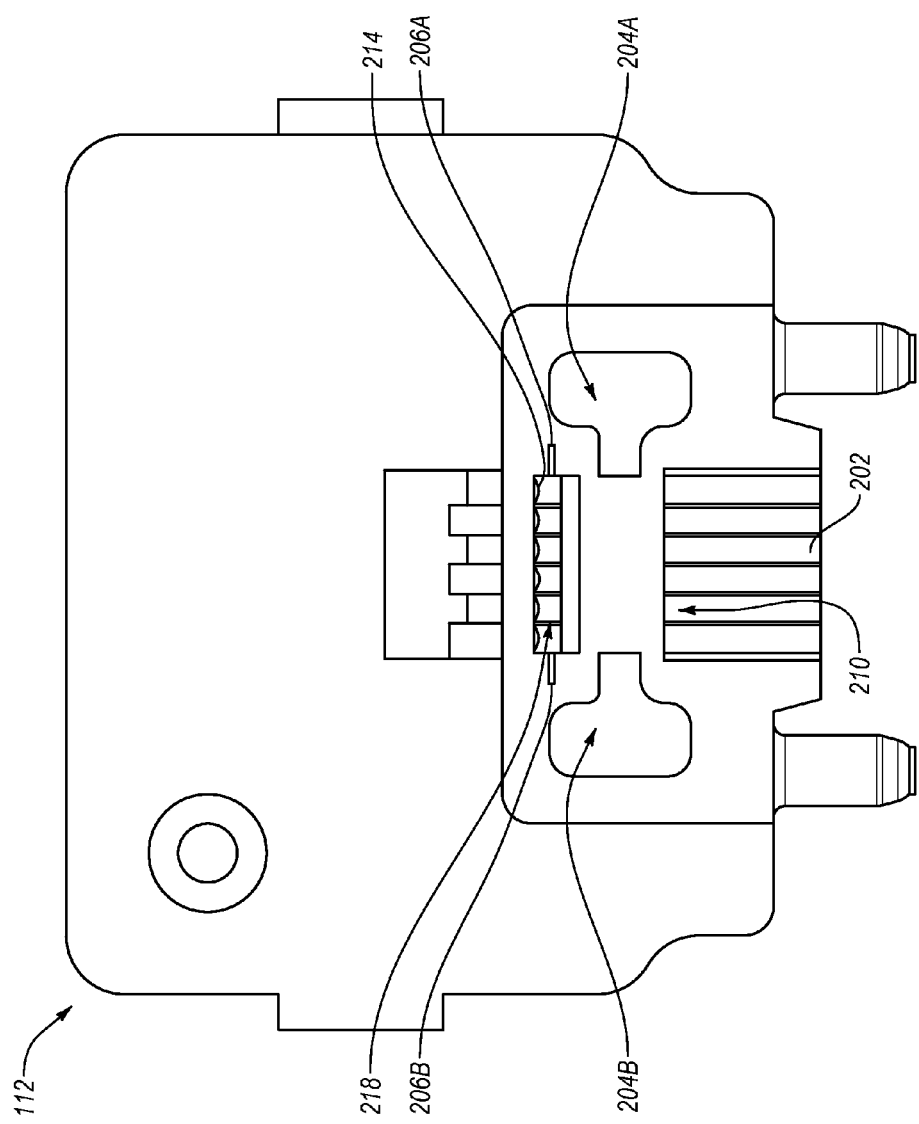
FIG. 2E is a top view of the lens block of FIG. 2A.

The lens block 112 may also include alignment guides 206A and 206B (both shown in FIGS. 2A, 2B, 2E, and 3, 206A only shown in FIG. 2D). Although shown as having two alignment guides 206A and 206B, the lens block 112 may include a different number of alignment guides. For example, the lens block 112 may include a single alignment guide, or three or more alignment guides. The alignment guides 206A and 206B may facilitate positioning the optical fiber ends 220 at a target distance from the lenses 214. As can be best seen in FIG. 3, the alignment guides 206A and 206B may be substantially in-plane with the optical fiber ends 220 when the optical fiber ends 220 are at a target distance from the lenses 214.

The alignment guides 206A and 206B may be recognized by an alignment device (not shown). In some embodiments, the lens block 112 may include a window 218 (shown in FIGS. 2A, 2B, 2D, 2E, and 3) to facilitate the alignment device also recognizing the optical fiber ends 220. For example, an alignment device may include a sensor such as a camera, a laser sensor, a touch-sensitive sensor, or the like, that may recognize the alignment guides 206A and 206B and the optical fiber ends 220. The alignment device may control the positioning of the optical fibers 102 such that the optical fibers 102 may be advanced and/or adjusted relative to the lens block 112 until the optical fiber ends 220 are aligned at a target distance from the lenses 214.

In some embodiments, a single optical fiber 102 may be secured to the lens block 112. Accordingly, reference to the optical fibers 102, the optical fiber seats 202, or the lenses 214 may be considered to describe also a single optical fiber 102, a single optical fiber seat 202, or a single lens 214.

Figure 4:
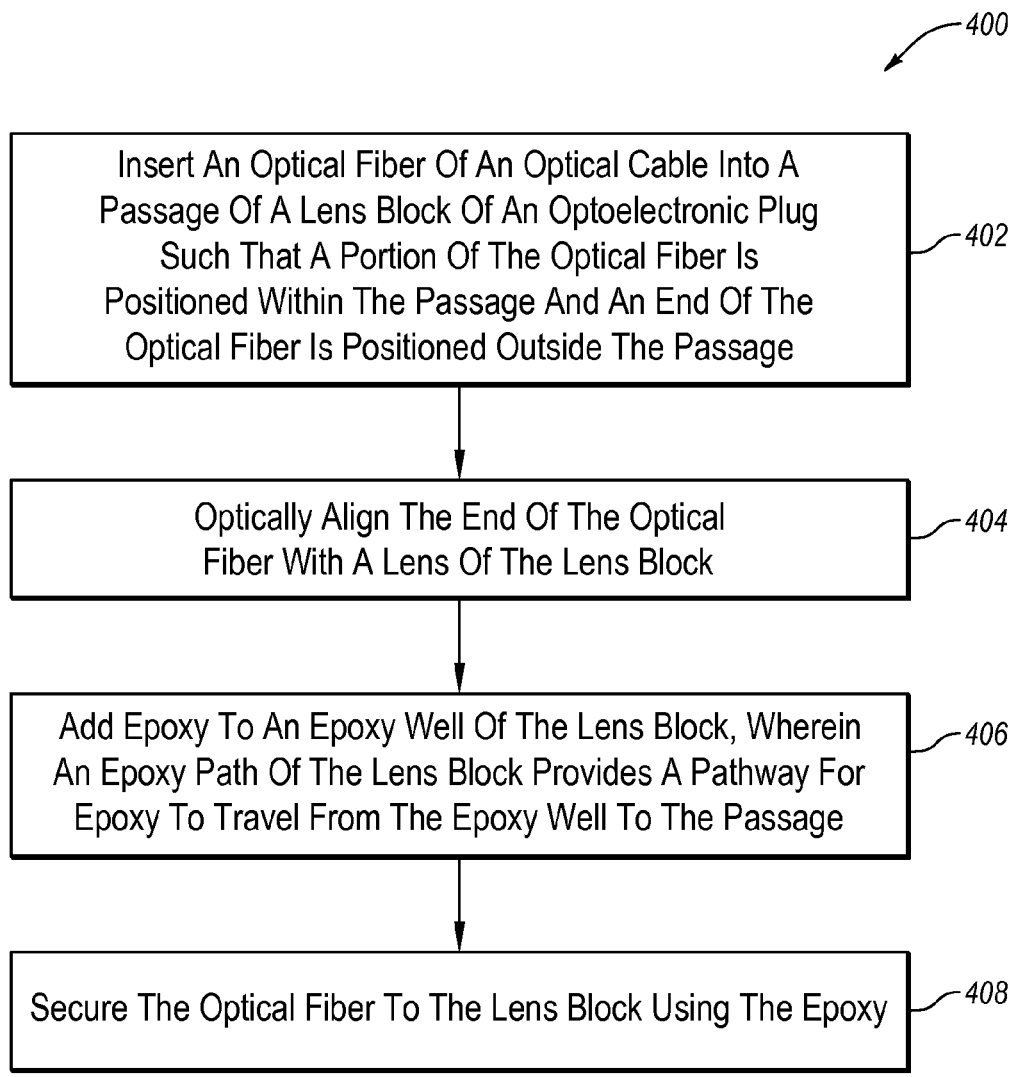
FIG. 4 is a flowchart of an example method to assemble an active cable device.

FIG. 4 is a flowchart of an example method 400 to assemble an active cable device, arranged in accordance with at least one embodiment described herein. The active cable device may include an optical cable with an optical fiber and an optoelectronic plug coupled to one end of the optical cable. The optoelectronic plug and the optical cable may include or correspond to the optoelectronic plug 100 and the optical cable 101 described herein.

The method 400 may begin at block 402 in which the optical fiber of the optical cable is inserted into the passage of the lens block of the optoelectronic plug such that a portion of the optical fiber is positioned within the passage and an end of the optical fiber is positioned outside the passage. Block 402 may include inserting the optical fibers 102 of the optical cable 101 into the passage 210 such that the optical fiber ends 220 pass through the entrance 212 and out the exit 224 of the passage 210.

At block 404, the end of the optical fiber may each be optically aligned with a lens of the lens block. For example, optically aligning the end of the optical fiber with the lens of the lens block may include positioning the optical fiber in an optical fiber seat, such as the optical fiber seats 202 described herein.

At block 406, epoxy may be added to an epoxy well of the lens block, where an epoxy path of the lens block provides a pathway for epoxy to travel from the epoxy well to the passage. The epoxy well and the epoxy path may respectively include the epoxy well 204A or 204B and the epoxy path 208A or 208B described herein.

At block 408, the optical fiber may be secured to the lens block using the epoxy. In some embodiments, securing the optical fiber to the lens block using the epoxy may include curing the epoxy after the epoxy travels from the epoxy well through the epoxy path into the passage and into simultaneous contact with the optical fiber and the passage.

Alternately or additionally, the epoxy may include a solid epoxy or a semi-solid epoxy and securing the optical fiber to the lens block using the epoxy may include heating the epoxy until the epoxy melts into a liquid state or is sufficiently viscous to travel from the epoxy well through the epoxy path into the passage and into simultaneous contact with the optical fiber and the passage.

Alternately or additionally, the epoxy may include a powder epoxy.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 400 may further include, prior to securing the optical fiber to the lens block using the epoxy, sensing a position of the end of the optical fiber relative to an alignment guide of the lens block and adjusting the position of the end of the optical fiber relative to the alignment guide until the sensed position of the end of the optical fiber is substantially at a target position determined by the alignment guide. The alignment guide may include the alignment guide 206A or 206B described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical fiber securing device comprising:
   a passage having an entrance and an exit, the passage configured to receive therein an optical fiber inserted through the entrance;
   an epoxy well configured to receive therein an epoxy;
   an epoxy path that provides a pathway for epoxy between the epoxy well and the passage;
   an optical fiber seat configured to receive at least a portion of the optical fiber, the optical fiber seat configured to position an end of the optical fiber in optical alignment with a lens; and
   a protrusion defining an upper boundary of the passage at the exit of the passage, the protrusion configured to restrain epoxy received within the passage such that the epoxy does not become interposed between the end of the optical fiber and the lens.

2. The optical fiber securing device of claim 1, wherein the passage is configured to receive at least a portion of the epoxy via capillary action through the epoxy path.

3. The optical fiber securing device of claim 1, wherein the protrusion is configured to restrain the epoxy at least in part by generating surface tension in the epoxy.

4. The optical fiber securing device of claim 1, wherein the optical fiber seat is located at least partially within the passage.

5. The optical fiber securing device of claim 1, wherein the optical fiber seat includes a curved receiving surface configured to position the end of the optical fiber into optical alignment with the lens.

6. The optical fiber securing device of claim 5, wherein the curved receiving surface has a substantially arc-shaped cross-sectional shape.

7. The optical fiber securing device of claim 1, further comprising an alignment guide configured to facilitate positioning the end of the optical fiber at a target distance from the lens.

8. The optical fiber securing device of claim 7, wherein the alignment guide is located substantially in-plane with the target distance from the lens such that the end of the optical fiber is at the target distance from the lens when the end of the optical fiber is in-plane with the alignment guide.

9. The optical fiber securing device of claim 8, wherein the alignment guide is configured to be recognized by an alignment device configured to control positioning of the optical fiber.

10. The optical fiber securing device of claim 1, wherein the optical fiber securing device is a lens block included in an optoelectronic plug.

11. An active cable device, comprising:
    an optical cable having opposing first and second ends and including an optical fiber extending from the first end to the second end; and
    an optoelectronic plug coupled to the first end of the optical cable, the optoelectronic plug including a lens block, wherein the lens block comprises:
    a lens;
    a passage configured to receive therein a portion of the optical fiber;
    an optical fiber seat defining a lower boundary of the passage and configured to optically align an end of the optical fiber with the lens;
    an epoxy well configured to receive therein epoxy;
    an epoxy path that provides a pathway for epoxy to travel from the epoxy well to the passage; and
    a protrusion defining an upper boundary of the passage at an exit of the passage, the protrusion configured to restrain epoxy received within the passage through the epoxy path from the epoxy well such that the epoxy does not become interposed between the end of the optical fiber and the lens.

12. The active cable device of claim 11, wherein the lens block further comprises an alignment guide located substantially in-plane with a target distance from the lens and configured to facilitate positioning the end of the optical fiber at the target distance from the lens.

13. The active cable device of claim 11, wherein the lens block further comprises:
    a second epoxy well configured to receive therein epoxy; and
    a second epoxy path that provides a pathway for epoxy to travel from the second epoxy well to the passage, wherein the epoxy well and the second epoxy well are positioned on opposite sides of the passage such that epoxy can enter the passage from the opposite sides of the passage.

14. A method of assembling an active cable device including an optical cable with an optical fiber and an optoelectronic plug coupled to one end of the optical cable, the method comprising:
    inserting the optical fiber of the optical cable into a passage of a lens block of the optoelectronic plug such that a portion of the optical fiber is positioned within the passage and an end of the optical fiber is positioned outside the passage;
    optically aligning the end of the optical fiber with a lens of the lens block;

adding epoxy to an epoxy well of the lens block, wherein an epoxy path of the lens block provides a pathway for epoxy to travel from the epoxy well to a protrusion defining an upper boundary of the passage;

restraining the epoxy received within the passage through the epoxy path from the epoxy well such that the epoxy does not become interposed between the end of the optical fiber and the lens; and securing the optical fiber to the lens block using the epoxy.

15. The method of claim 14, wherein optically aligning an end of the optical fiber with a lens of the lens block comprises positioning the optical fiber in an optical fiber seat of the lens block that defines a lower boundary of the passage.

16. The method of claim 14, wherein securing the optical fiber to the lens block using the epoxy includes curing the epoxy after the epoxy travels from the epoxy well through the epoxy path into the passage and into simultaneous contact with the optical fiber and the passage.

17. The method of claim 14, wherein the epoxy added to the epoxy well comprises a solid epoxy or a semi-solid epoxy and wherein securing the optical fiber to the lens block using the epoxy includes heating the epoxy until the epoxy melts into a liquid state or is sufficiently viscous to travel from the epoxy well through the epoxy path into the passage and into simultaneous contact with the optical fiber and the passage.

18. The method of claim 14, wherein the epoxy added to the epoxy well comprises a powder epoxy.

19. The method of claim 14, further comprising, prior to securing the optical fiber to the lens block using the epoxy:

sensing a position of the end of the optical fiber relative to an alignment guide of the lens block; and adjusting the position of the end of the optical fiber relative to the alignment guide until the sensed position of the end of the optical fiber is substantially at a target position determined by the alignment guide.

\* \* \* \* \*